(12) United States Patent
Mantani (10) Patent No.: US 7,580,611 B2
(45) Date of Patent: Aug. 25, 2009

(54) DATA REPRODUCING DEVICE CAPABLE OF READING AND REPRODUCING ONLY REPRODUCIBLE INFORMATION

(75) Inventor: Nobunori Mantani, Daito (JP)

(73) Assignee: Funai Electric Co., Ltd., Daito-shi, Osaka (JP)

(*) Notice: Subject to any disclaimer, the term of this patent is extended or adjusted under 35 U.S.C. 154(b) by 792 days.

(21) Appl. No.: 11/237,211

(22) Filed: Sep. 28, 2005

(65) Prior Publication Data
US 2006/0072896 A1    Apr. 6, 2006

(30) Foreign Application Priority Data
Oct. 1, 2004    (JP)    ............... 2004-290257

(51) Int. Cl.
*H04N 7/00* (2006.01)
*H04N 5/00* (2006.01)

(52) U.S. Cl. ......................................... 386/46; 386/125

(58) Field of Classification Search .................. 386/46, 386/125, 124, 126, 45
See application file for complete search history.

(56) References Cited

U.S. PATENT DOCUMENTS 6,510,127 B1 *    1/2003    Kim ........................ 369/275.2

FOREIGN PATENT DOCUMENTS

| EP | 1026682 | 8/2000 |
|---|---|---|
| JP | 5210845 | 8/1993 |
| JP | 8-17149 | 1/1996 |
| JP | 09-073727 | 3/1997 |
| JP | 10-269751 | 10/1998 |
| JP | 11-353651 | 12/1999 |
| JP | 2001-008158 | 1/2001 |
| JP | 2001043639 | 2/2001 |
| JP | 2001-273730 | 10/2001 |
| JP | 2001-332039 | 11/2001 |
| JP | 2001-338459 | 12/2001 |
| JP | 2003-16763 | 1/2003 |

OTHER PUBLICATIONS

Notice of the Reason for Refusal mailed Nov. 7, 2006 in Japanese Application No. 2004-290257, and English translation thereof (4 pages).
Patent Abstracts of Japan, Publication No. 09-073727 dated Mar. 18, 1997 (1 page).
Japanese Office Action for Japanese Application No. 2004-290257 mailed on Jan. 30, 2007 (9 pages).
Patent Abstracts of Japan, Publication No. 2001-043639, Publication Date: Feb. 16, 2001, 1 page.

(Continued)

*Primary Examiner*—Robert Chevalier
(74) *Attorney, Agent, or Firm*—Osha • Liang LLP (57) ABSTRACT

A CPU obtains select information from a flash memory. The CPU provides a reproduction instruction for reproducing only data selected according to the select information. The decoder unit reproduces data in response to a reproduction instruction, and provides a reproduction result. When the reproduction result indicates non-reproducibility, the CPU changes the select information. The data indicated as non-reproducible data is no longer reproduced in subsequent reproducing operations, and only the reproducible data will be reproduced. Therefore, it is possible to provide a data reproducing device that can read and reproduce only the correctly reproducible data from the data recorded on a record medium.

4 Claims, 6 Drawing Sheets

OTHER PUBLICATIONS

Patent Abstracts of Japan, Publication No. 05-210845, Publication Date: Aug. 20, 1993, 1 page.
Office Action in Japanese Patent Application No. 2007-151690, with English translation, mailed Jan. 29, 2008 (8 pages).
Patent Abstracts of Japan, Publication No. 08-017149, Publication Date: Jan. 19, 1996, 1 page.
Patent Abstracts of Japan, Publication No. 10-269751, Publication Date Oct. 9, 1998, 1 page.
Patent Abstracts of Japan, Publication No. 2001-332039, Publication Date: Nov. 30, 2001, 1 page.
Patent Abstracts of Japan, Publication No. 2003-016763, Publication Date: Jan. 17, 2003, 1 page.
Japanese Office Action in Patent application No. JP 2004-290257, mailed Aug. 8, 2006, and English translation thereof, 4 pages.
Patent Abstracts of Japan, Publication No. 2001-338459, Date of Publication: Dec. 7, 2001, 1 page.
Patent Abstracts of Japan, Publication No. 2001-273730, Publication Date: Oct. 5, 2001, 1 page.
International publication No. 97/05616, published by the World Intellectual Property Organization on Feb. 13, 1997, 29 pages.

* cited by examiner

DATA REPRODUCING DEVICE CAPABLE OF READING AND REPRODUCING ONLY REPRODUCIBLE INFORMATION

BACKGROUND OF THE INVENTION

1. Field of the Invention

The present invention relates to a data reproducing device reproducing information such as a picture and/or music recorded on a record medium, and particularly to a data reproducing device capable of reading and reproducing only reproducible information.

2. Description of the Background Art

In recent years, performance of personal computers has been increased, and it can relatively easily achieve processing of compressing video and/or audio data, and recording it on a medium such as a disc. As examples of such data compression, there have been MP3 (MPEG-1 Audio Layer3) and WMA (Windows (registered trademark) Media Audio) for music, JPEG (Joint Photographic Experts Group) for still pictures and MPEG4 (Moving Picture Experts Group phase 4) for movie. The disc is, for example, a CD-ROM (Compact Disc-Read Only Memory), CD-R (Compact Disc-Recordable) and DVD (Digital Versatile Disc).

When an error occurs in an operation of recording data on a disc, the data will not be reproduced correctly. When the disc bearing the data is scratched or smeared, data recorded on the scratched or smeared portion will not be reproduced correctly. Therefore, devices and methods for avoiding this problem have been proposed.

For example, Japanese Patent Laying-Open No. 08-017149 has disclosed an example of a picture reproducing device including an error picture storage unit and a picture read instructing unit instructing a reading unit to read picture information, from which error pictures are removed, in a picture reproducing operation.

Japanese Patent Laying-Open No. 10-269751 has disclosed an example of an information recording/reproducing device provided with a unit which can detect a servo error such as off-track in a write test mode, and thereby will record an error address on a disc at the end of the write test.

Japanese Patent Laying-Open No. 2001-332039 has disclosed a drive and a data reading method as well as an information record medium reproducing device and a data reproducing method. According to these devices and methods, a read operation is effected on all designated address regions while holding read error information. Thereby, a real-time property in a data reproducing operation can be ensured without interrupting the read operation, and reproduction of error data can be suppressed.

Capacities of the discs have been increasing, and more data can now be recorded on the discs. Accordingly, the disc device is required to read designated data fast among the plurality of data items recorded on the disc. As examples of a device and a method for reading fast a designated file on a disc, Japanese Patent Laying-Open No. 2003-016763 has disclosed a disc access device and a disc access method which employ a storage unit including a first table storing folder addresses and a second table representing bits corresponding to the files, and thereby can perform fast retrieval even when the files are large in number.

When a private user records various kinds of data on a disc, such disc may bear data (e.g., data of word processor software) which cannot be reproduced as music data or video data by the disc reproducing device. Even when the data on the disc is music or video data, the disc reproducing device cannot reproduce it in some cases due to a difference, e.g., in data format or a compression bit rate.

The conventional disc reproducing device attempts to reproduce the data in spite of the fact that the data format does not allow reproduction, and therefore an error occurs in the reproducing operation. However, the conventional disc reproducing device has not held a result of past reproduction of the same data. Therefore, the disc reproducing device performs the reproduction processing even when it is apparent that the data cannot be reproduced. Accordingly, the user must wait until the disc reproducing device issues a result indicating the reproduction error.

SUMMARY OF THE INVENTION

The invention overcomes the above disadvantages, and it is an object of the invention to provide a data reproducing device which can read and reproduce only correctly reproducible data among data items recorded on a record medium.

In summary, the invention provides a data reproducing device including a reading unit reading a plurality of items of data recorded on a removable record medium; a storing unit provided for each of said record medium(s) and nonvolatilely storing select information indicating for each of the data items whether the data item is to be selected as a reproduction target or not; and a reproducing unit reproducing the data selected based on the select information, and changing the select information not to select the selected data in subsequent reproducing operations when the selected data is not reproducible. The reproducing unit includes a display unit displaying data information relating to the plurality of items of the data, an input unit receiving a select signal provided from a user when the user selects the data to be reproduced based on the data information, a control circuit operating, when the select signal is not input, to change the select information when non-reproducibility is indicated by a reproduction result received in response to output of a reproduction instruction for the selected data, and operating, when the select signal is input, to change the select information when non-reproducibility is indicated by the reproduction result received in response to output of the reproduction instruction for the data selected by the user according to the select signal, and a reproducing circuit reproducing the data according to the reproduction instruction, and providing the reproduction result.

According to another aspect of the invention, a data reproducing device includes a reading unit reading a plurality of items of data recorded on a record medium; a storing unit storing select information indicating for each of the data items whether the data is to be selected as a reproduction target or not; and a reproducing unit reproducing the data selected based on the select information, and changing the select information not to select the selected data in subsequent reproducing operations when the selected data is not reproducible.

Preferably, the reproducing unit includes a control circuit changing the select information when non-reproducibility is indicated by a reproduction result received in response to output of a reproduction instruction for the selected data, and a reproducing circuit reproducing the data according to the reproduction instruction, and providing the reproduction result.

Preferably, the reproducing unit includes a display unit displaying data information relating to the plurality of data items, an input unit receiving a select signal provided from a user when the user selects the data to be reproduced based on the data information, a control circuit providing a reproduction instruction for the data selected by the user according to the select signal, and a reproducing circuit reproducing the data according to the reproduction instruction.

More preferably, the control circuit changes the select information when the reproduction result received from the reproducing circuit indicates non-reproducibility.

Further preferably, the storing unit nonvolatilely stores the select information.

Further preferably, the record medium is removable, and the select information is provided for each record medium.

According to a major advantage of the invention, it is determined with reference to the stored determination result whether the data read from the record medium is reproducible or not. When the determination result is reproducible, the data is analyzed before reproduction, and the reproducible data is reproduced. Therefore, an error does not occur in the reproduction operation, and it is possible to reduce a wait time from the end of data reproduction to the start of reproduction of next data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description, the same or corresponding portions bear the same reference numbers.

Figure 1:
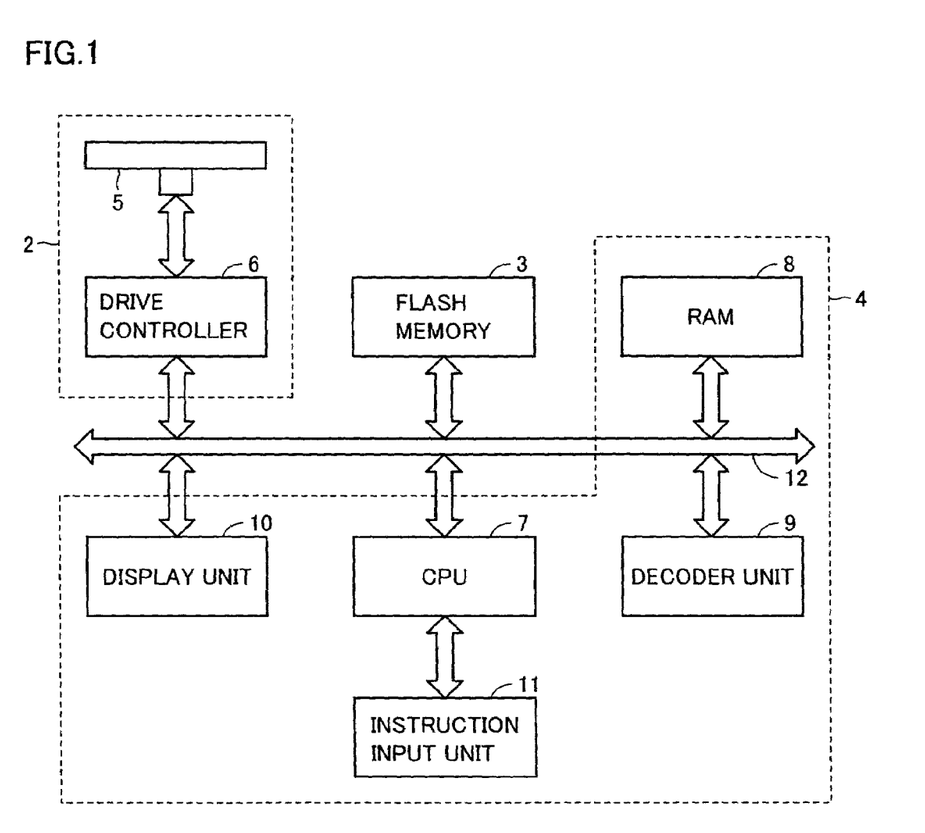
FIG. 1 shows an example of a structure of a data reproducing device of the invention.

FIG. 1 shows an example of a structure of a data reproducing device of the invention.

Referring to FIG. 1, a disc reproducing device 1 includes a reading unit 2 reading a plurality of items of data, which are recorded on a removable disc (not shown) and is prepared by compressing picture information, music information and/or the like, a flash memory 3 nonvolatilely storing select information indicating whether each of the data items is to be selected as a reproduction target or not, and a reproducing unit 4 which reproduces the data selected according to the select information, and changes the select information not to select the currently selected data in subsequent reproduction operations when the select information indicates non-reproducibility.

Reading unit 2 includes a disc drive 5 for turning a disc, and a drive controller 6 controlling disc drive 5 for reading information from the disc. Disc drive 5 is, e.g., a spindle motor. Drive controller 6 includes a motor control circuit, a semiconductor laser, a pickup device and others. The data read by drive controller 6 is provided to reproducing unit 4.

In addition to the select information, flash memory 3 may store various programs for controlling operations of disc reproducing device 1. Although flash memory 3 is a storing unit in this invention, the storing unit is not restricted to the flash memory, and may be another kind of storage device such as an EEPROM (Electrically Erasable and Programmable ROM) or a hard disc. The storing unit storing the select information may be another kind of nonvolatile storing device such as a DRAM (Dynamic Random Access Memory) provided that it is continuously supplied with a power.

Reproducing unit 4 includes a CPU (Central Processing Unit) 7 for concentratedly controlling and monitoring operations of various units and portions, a RAM 8 for temporarily storing data provided from drive controller 6 and a result of processing of CPU 7, a decoder unit 9 decoding and reproducing the data stored in RAM 8, a display unit 10 displaying information such as a song title or a file name relating to the data recorded on the disc, and an instruction input unit 11 through which a user enters an instruction (select signal), e.g., by a remote control (not shown), operation buttons (not shown) or the like when the user selects the data to be reproduced based on the information displayed on display unit 10. The blocks in disc reproducing device 1 are connected via an internal bus 12.

CPU 7 provides a reproduction instruction for the data selected in the select information or selected by the user, and changes the select information when the reproduction result received from decoder unit 9 indicates non-reproducibility. Details of the operation of CPU 7 will be described later.

Decoder unit 9 receives the reproduction instruction from CPU 7, reproduces the selected data and provides the result of reproduction.

The processing of the data reproducing device in this invention can be summarized as follows. CPU 7 obtains the select information from flash memory 3. CPU 7 provides the reproduction instruction for reproducing only the data selected in the select information. Decoder unit 9 reproduces the data in response to the reproduction instruction, and provides the reproduction result. When the reproduction result indicates non-reproducibility, CPU 7 changes the select information. The data, which is indicated as non-reproducible data, is no loner reproduced, and only the reproducible data will be reproduced.

Figure 2:
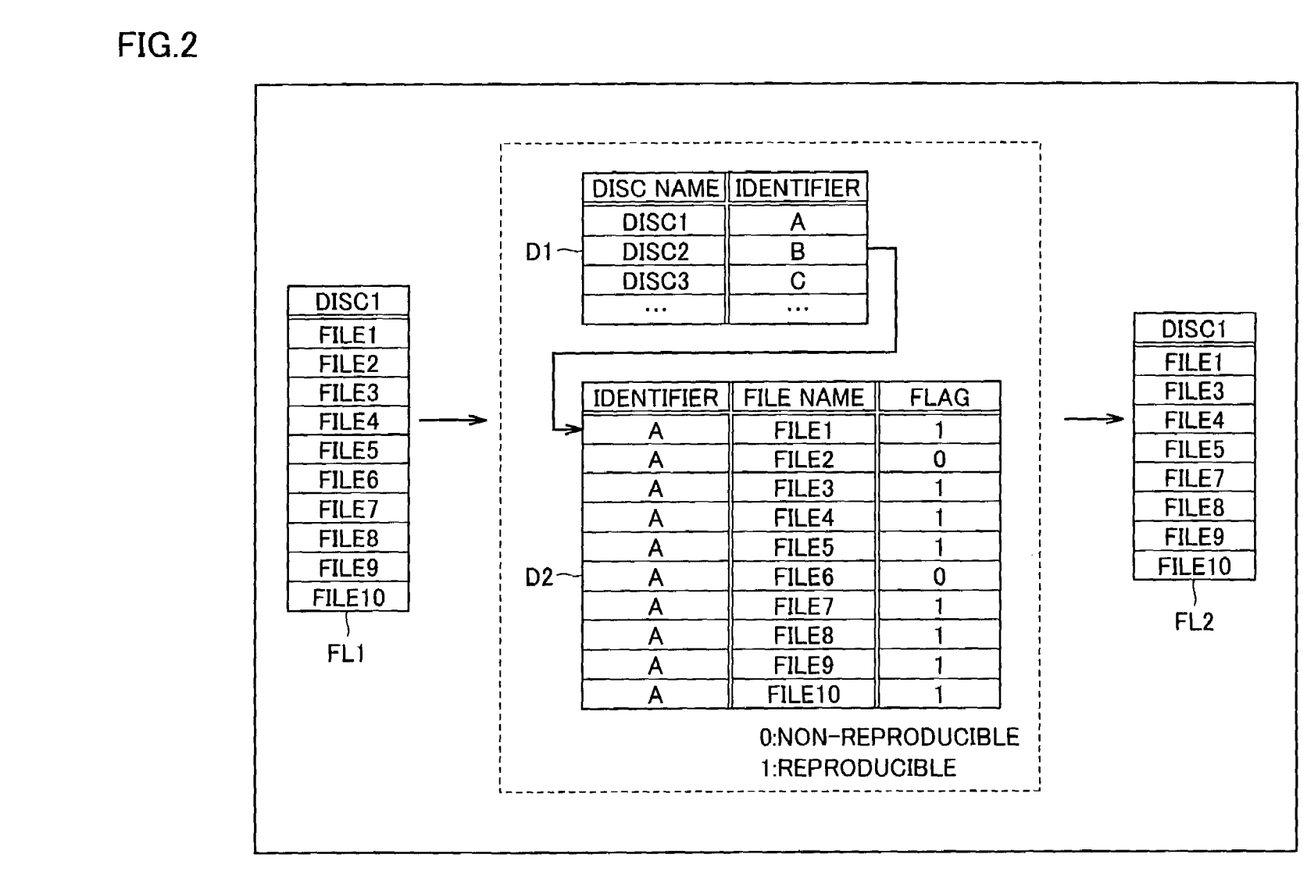
FIG. 2 illustrates an example of select information stored in a flash memory 3 shown in FIG. 1.

FIG. 2 shows an example of the select information stored in flash memory 3 in FIG. 1.

Referring to FIG. 2, it is assumed that a disc DISC1 (not shown in the figure) bears ten data files (which will be merely referred to as "files" hereinafter) FILE1-FILE10. A file list FL1 represents the names of files recorded on disc DISC1 in a list form.

Flash memory 3 in FIG. 1 has stored data D1 and D2. Data D1 and D2 correspond to the select information. Data D1 includes disc names of discs, which were reproduced in the past, and identifiers corresponding to the respective disc names. Data D2 includes the identifiers kept in data D1, file names corresponding to the identifiers and flags each indicating a result of determination about the reproducibility/non-reproducibility of the corresponding file. When the file is not reproducible, the flag indicates "0". When the file is reproducible, the flag indicates "1". In the example illustrated in FIG. 2, therefore, the files recorded on disc DISC1 include reproducible files FILE2 and FILE6.

File list FL2 represents the files which were determined as the reproducible files by CPU 7 in FIG. 1 obtaining the select information of disc DISC 1. File list FL2 does not include file names of two files FILE2 and FILE6 included in file list FL1.

Figure 3:
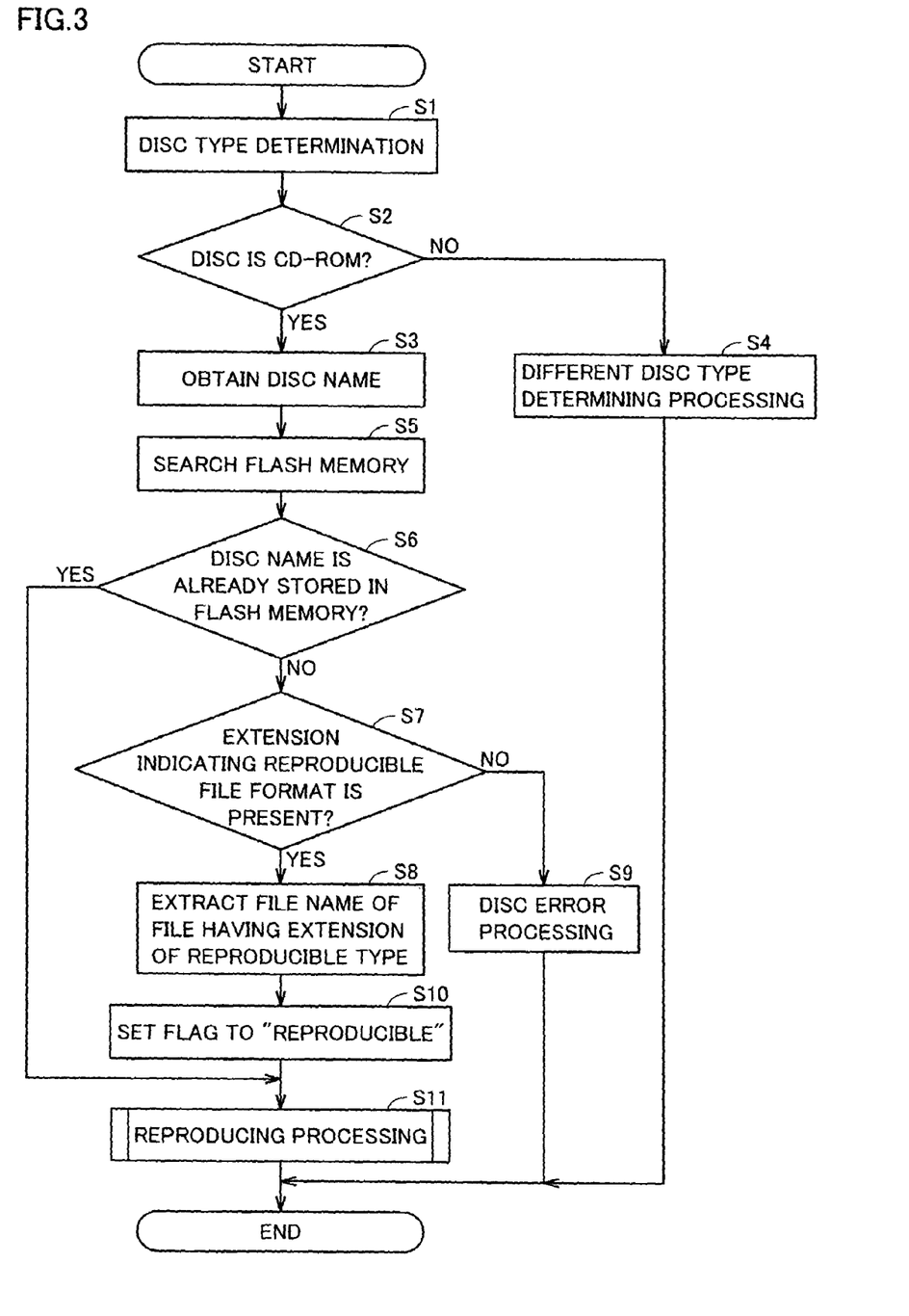
FIG. 3 is a flowchart illustrating a detail of processing of a disc reproducing device 1 in FIG. 1.

FIG. 3 is a flowchart specifically illustrating processing of disc reproducing device 1 in FIG. 1.

Referring to FIG. 3, disc type determining processing is first performed in step S1 for determining a type of a disc inserted into disc reproducing device 1 in FIG. 1. For the sake of illustration, it is assumed that the following operation is performed to determine whether the disc is a CD-ROM or not.

In step S1, CPU 7 provides an identification signal to drive controller 6 for determining whether the inserted disc is a CD-ROM or not. Drive controller 6 receives the identification signal, and select a semiconductor laser for CD between a semiconductor laser for DVD and the semiconductor laser for CD. The semiconductor laser for CD emits a laser beam onto the disc, and a pickup device receives a beam reflected by the disc. The pickup device converts the received light into an electric signal, and provides it as a result of detection.

In next step S2, CPU 7 receives the result of detection, and determines whether the disc is the CD-ROM or not. When CPU 7 determines in step S2 that the disc is the CD-ROM, CPU 7 obtains a disc name from the disc (CD-ROM) in step S3. When CPU 7 determines in step S2 that the disc is not CD-ROM, it performs in step S4 processing (i.e., different disc type determining processing) for determining or specifying the type of the disc, which is inserted into the disc reproducing device, among various types of discs (e.g., DVD and CD-R).

In step S5 subsequent to step S3, CPU 7 retrieves a disc name stored in flash memory 3. When CPU 7 determines in step S6 that the disc name is already stored in flash memory 3, it performs the reproducing processing in step S11. The reproducing processing in step S11 will be described later.

When CPU 7 determines in step S6 that the disc name is not stored in flash memory 3, it obtains an extension included in the file name in step S7.

In step S7, CPU 7 determines whether the obtained extension is an extension of a reproducible type. For example, when disc reproducing device 1 can reproduce music data compressed in the MP3 format, CPU 7 determines whether the extension "MP3" is present in the obtained extension or not.

When the extension of the reproducible type is present in step S7, CPU 7 extracts the file name including the extension of the reproducible type in step S8. When the extension of the reproducible type is not present in step S7, error display processing is performed in step S9 for informing the user that no reproducible data is recorded on the disc. In the error display processing, CPU 7 provides the error display instruction to display unit 10, and display unit 10 displays, e.g., "Read Error".

In step S10 subsequent to step S8, CPU 7 transfers the disc name, identifier, file name and flag to flash memory 3. Flash memory 3 stores these information items according to formats of data D1 and D2 illustrated in FIG. 2. The processing in steps S7 and S8 is performed when the disc in question is first reproduced by the disc reproducing device so that the flag stored in flash memory 3 must be set to the initial value. Accordingly, the flag in step S10 is set to "1" indicating that the data is reproducible.

Subsequent to step S10, CPU 7 performs the reproduction processing in step S11.

Figure 4:
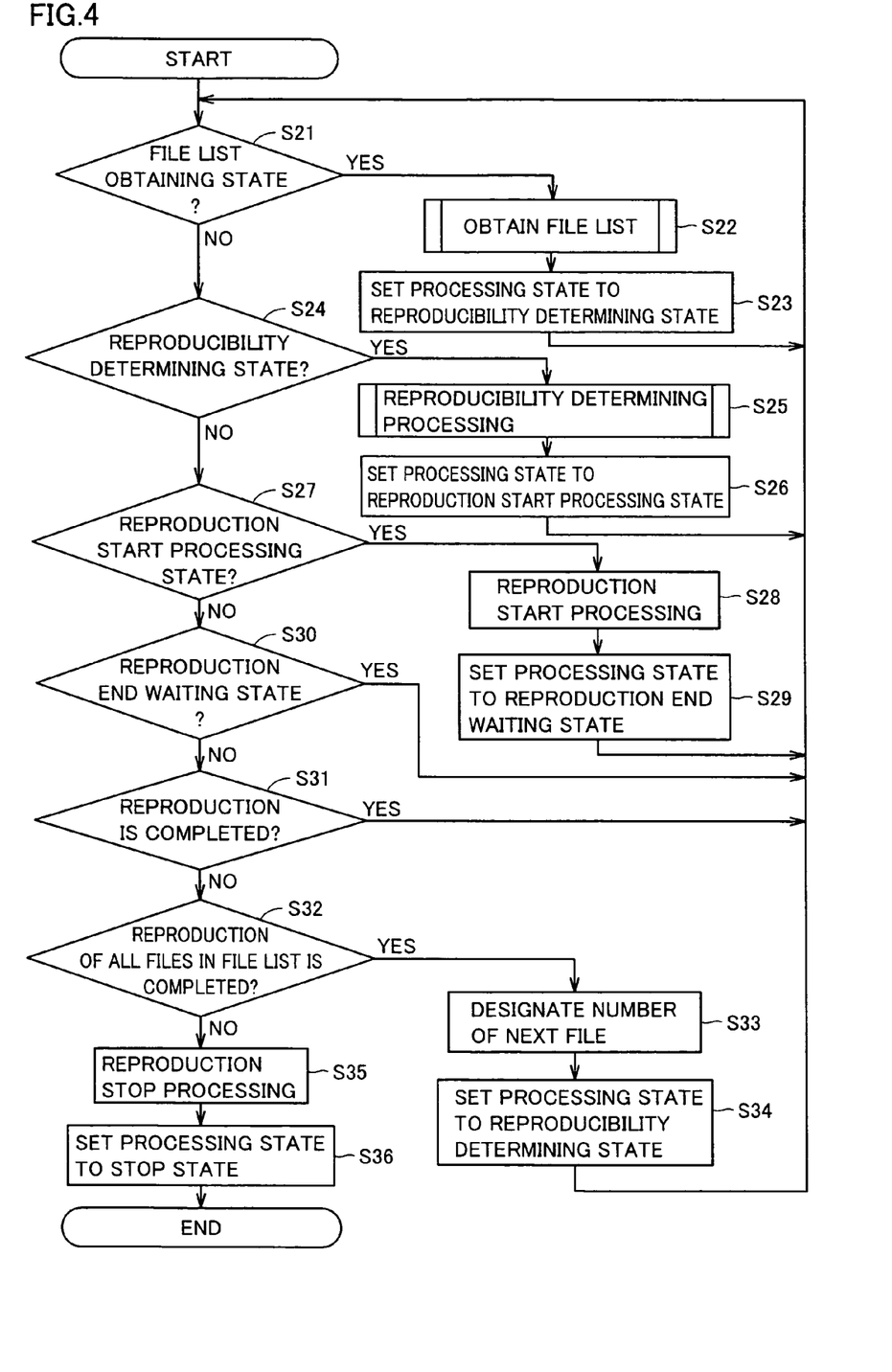
FIG. 4 is a flowchart illustrating reproduction processing in step S11 illustrated in FIG. 3.

FIG. 4 is a flowchart illustrating reproduction processing in step S11 in FIG. 3.

Referring to FIG. 4, CPU 7 determines in step S21 whether the processing state is a file list obtaining state or not. It is assumed that the processing state of CPU 7 is stored, e.g., in RAM 8 in FIG. 1, and is updated by CPU 7. The "file list obtaining state" indicates the state in which CPU 7 is performing the processing of obtaining the list of files to be processed for reproduction from flash memory 3 based on the select information stored in flash memory 3.

When the processing state is the file list obtaining state in step S21, CPU 7 obtains the file list from flash memory 3 in step S22. The file list represents the file names of the reproducible files among the files recorded on a certain disc, and is, e.g., file list FL2 in FIG. 2.

In step S23 subsequent to step S22, CPU 7 sets the processing state to a reproducibility determining state. The "reproducibility determining state" is a state in which processing (reproducibility determining processing) is being performed for determining whether the reproduction target data is reproducible or not. When the processing state is set to the reproducibility determining state, the process returns to step S21.

When the processing state is not the file list obtaining state in step S21, CPU 7 determines in step S24 whether the processing state is the reproducibility determining state or not. When the processing state is the reproducibility determining state, CPU 7 performs the reproducibility determining processing in step S25 by determining whether the file is reproducible or not, and changing the select information when the result of the determination indicates non-reproducibility. The reproducibility determining processing will be described later.

For example, in the operation of reproducing the disc first, the file recorded on the disc is determined according to only the extension, and it is set in the select information that the file is reproducible. Even when the file is not reproducible according to the select information, the user may select it as the reproduction target file. In these cases, an error may occur when the file is reproduced. Accordingly, the reproducibility determining processing is performed for preventing the reproduction error.

In step S26 subsequent to step S25, CPU 7 sets the processing state to a reproduction start processing state. When the processing state is set to the reproduction start processing state, the process returns to step S21.

When the processing state is not the reproducibility determining state in step S24, CPU 7 determines in step S27 whether the processing state is the reproduction start processing state or not. The reproduction start processing state is a state in which the reproduction processing is performed so that the user can view or listen to the picture or music.

When the processing state is the reproduction start processing state, CPU 7 performs the reproduction start processing in step S28. In the reproduction start processing, CPU 7 provides an instruction for starting the reproduction of the file. Decoder unit 9 starts the reproduction of the data in response to reception of the instruction from CPU 7. In step S29 subsequent to step S28, CPU 7 sets the processing state to a reproduction processing waiting state. When the processing in step S29 ends, the process returns to step S21.

When the processing state in step S27 is not the reproduction start processing state, CPU 7 determines in step S30 whether the processing state is a reproduction end waiting state or not. The "reproduction end waiting state" is a state in which the file is being produced. When the processing state is the reproduction end waiting state in step S30, the process returns to step S21.

When the processing state is not the reproduction end waiting state in step S30, CPU 7 determines in step S31 whether the reproduction is completed or not.

When the file reproduction is not completed in step S31, the process returns to step S21. When the reproduction is completed in step S31, CPU 7 determines in step S32 whether reproduction of all the files in the file list is completed or not.

When a file not yet reproduced remains in step S32 (NO in step S32), CPU 7 designates the number of the next file in step S33, and sets the processing state to the reproducibility determining state in step S34. When the processing state is set to the reproducibility determining state, the process returns to step S21.

When the reproduction of all the files is completed in step S32, CPU 7 performs reproduction stop processing in step S35. In step S36 subsequent to step S35, CPU 7 sets the processing state to a stop state.

Figure 5:
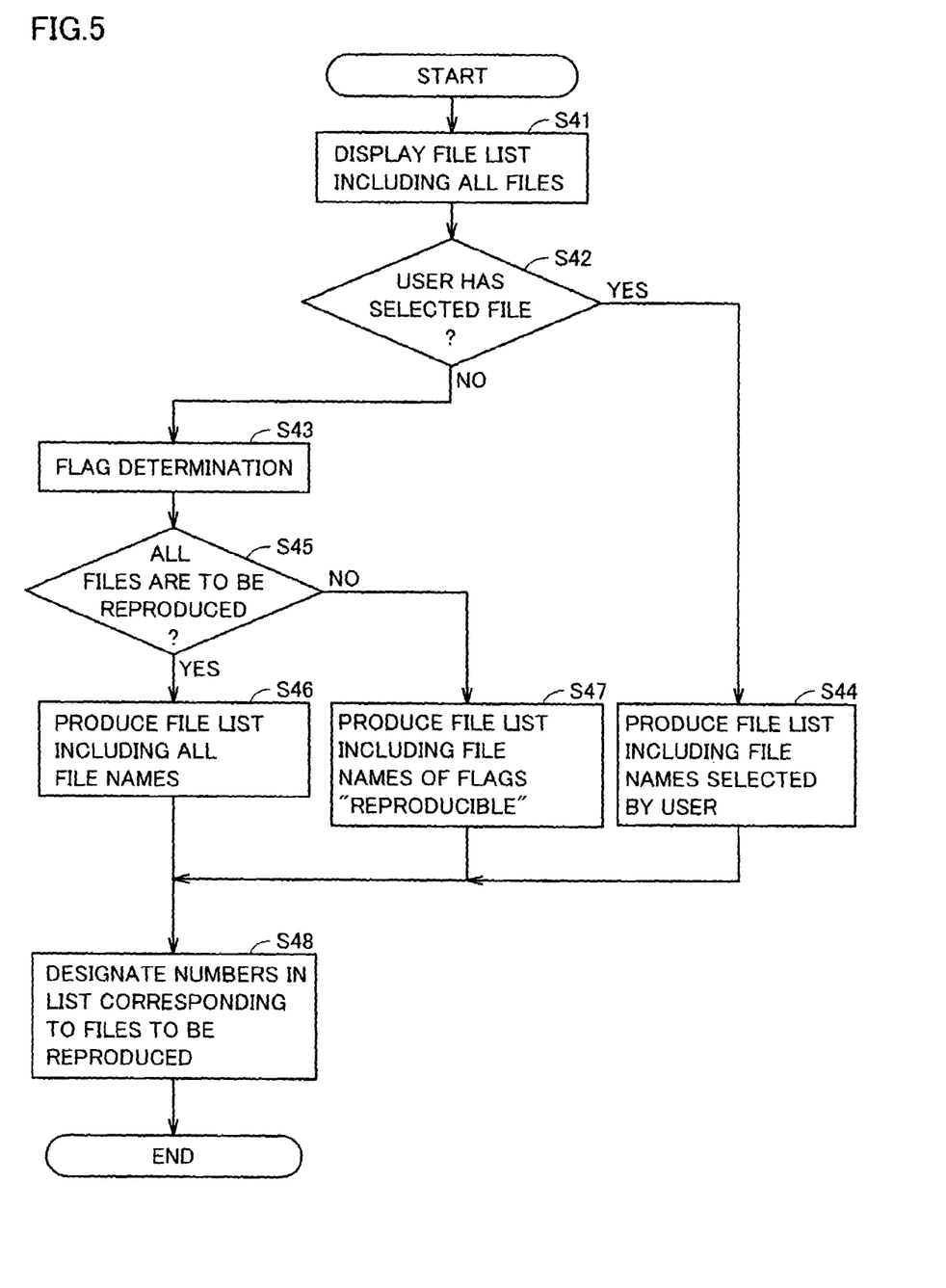
FIG. 5 is a flowchart illustrating file list obtaining processing in step S22 illustrated in FIG. 4.

FIG. 5 is a flowchart illustrating a file list obtaining processing in step S22 in FIG. 4.

Referring to FIG. 5, when the processing starts, CPU 7 first searches flash memory 3 in step S41, and instructs display unit 10 to display the file list including the file names of all the files recorded on the inserted disc. Display unit 10 displays the file list in response to the instruction of CPU 7. In the file list, the reproducible files are displayed, e.g., in a color different from that of the non-reproducible files so that the user can easily discriminate between the reproducible files and the non-reproducible files.

In next step S42, CPU 7 determines whether the select signal is input or not, and thereby determines whether the user has selected the file or not. When the user has not selected the file in step S42, CPU 7 searches flash memory 3 in step S43 to obtain the flag corresponding to the file in question, and determines whether this file is reproducible or not. When the user has selected the file, instruction input unit 11 transmits the received select signal to CPU 7. In step S44, CPU 7 produces the file list including the file names selected by the user according to the select signal.

In step S45 subsequent to step S43, CPU 7 refers to the flags stored in flash memory 3, and determines whether all the files recorded on the disc are to be reproduced or not. In step S45, when all the files are to be reproduced, CPU 7 produces the file list including all the file names in the disc.

When there is a file determined as a non-reproducible file in step S43, the process proceeds from step S45 to step S47. In step S47, CPU 7 produces the file list formed of only the names of files of which flags indicate the reproducible states, respectively.

After performing the processing in steps S44, S46 and S47, CPU 7 determines in step S48 the numbers of the files to be reproduced in the prepared file list. The numbers are determined, e.g., in ascending order from the list. In the case of random reproduction, the numbers are randomly determined from the list. In the case of programmed reproduction, the numbers are determined in the order that is designated by the user.

Figure 6:
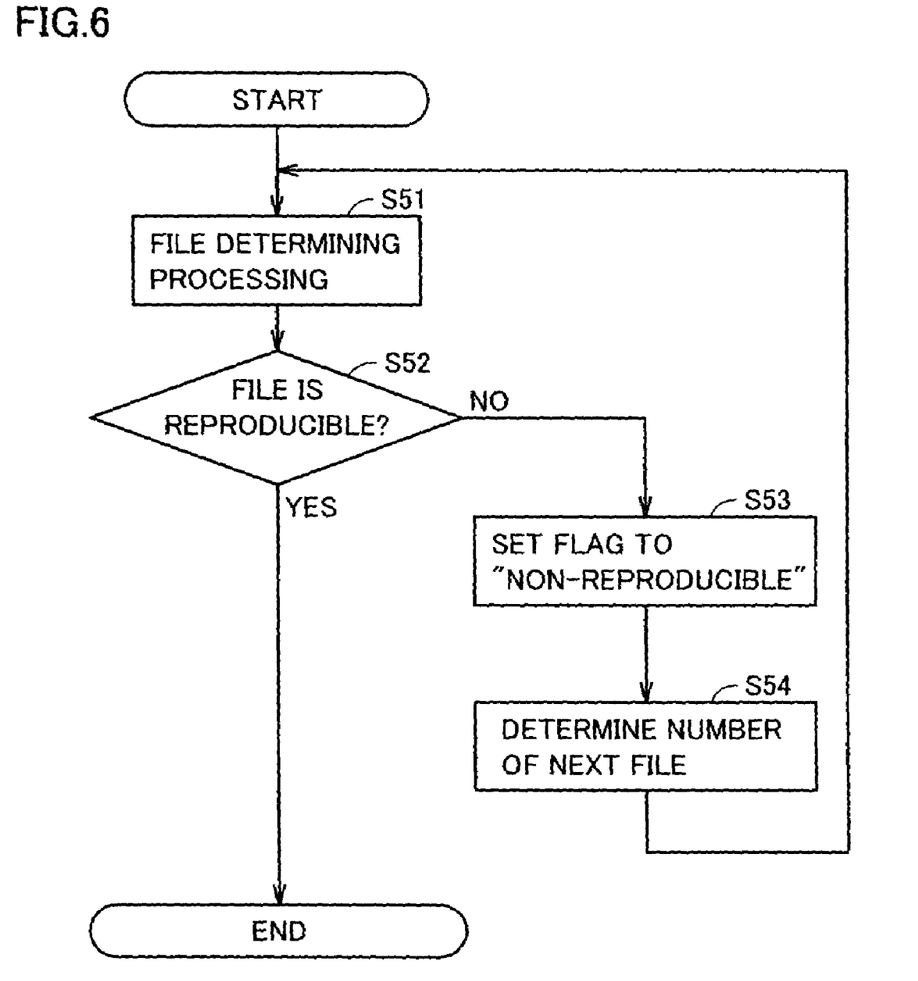
FIG. 6 is a flowchart illustrating reproducibility determining processing in step S25 illustrated in FIG. 4.

FIG. 6 is a flowchart illustrating the reproducibility determining processing in step S25 in FIG. 4.

Referring to FIG. 6, when the processing starts, the file determining processing is first performed in step S51. In response to the determination of the file to be reproduced in step S48, CPU 7 provides the reproduction instruction to decoder unit 9. In response to the reproduction instruction, decoder unit 9 reproduces the data, and provides the reproduction result.

As the reproduction result, decoder unit 9 may provide a result of provisional reproduction which is performed in a manner not providing a reproduced sound and/or a reproduced picture to the user. Also, for reducing the time required before providing the reproduction result, decoder unit 9 may provide, as the reproduction result, information such as a compression format and a bit rate (e.g., the compression format of MP3 and the bit rate of 128 kbps) obtained in response to the reproduction instruction. CPU 7 determines whether the file in quest is reproducible or not, in response to the reproduction result received from decoder unit 9.

In step S52, when CPU 7 determines that the file is reproducible, it ends the processing. The file determined as the reproducible file is reproduced when the reproduction start processing is performed in step S28 in FIG. 4.

Conversely, when CPU 7 determines in step S52 that the file is not reproducible, it sets the flag of the file in question stored in flash memory 3 to "0" indicating non-reproducibility in step S53. The file determined as the non-reproducible file is not reproduced.

Since the file list produced in step S44 in FIG. 5 includes the file names of the files selected by the user, the list may include a non-reproducible file(s). Even in this case, the processing in steps S51-S53 is effected on the non-reproducible files to set the flag of the select information thereof stored in flash memory 3 to "0" indicating the non-reproducible file. Thus, the select information is likewise updated according to the processing in steps S51-S53 when the result of reproduction of the file selected by the user indicates non-reproducibility.

The file, which could not be reproduced before that time, may become reproducible when dust and/or smear are removed from a record surface of the disc. For updating the select information for the above file, processing may be added, e.g., after step S52 for changing the flag to "1" indicating the reproducible file when the file is determined as the reproducible file, e.g., in step S52 (when YES in step S52).

In step S54 subsequent to step S53, CPU 7 determines the number of the file to be subjected to the next determining processing. When the processing ends in step S54, the file determining processing is performed again in step S51.

In the description of the embodiment, the data reproducing device of the invention is applied by way of example to the disc reproducing device. However, the disc is not restricted to the disc such as a DVD removably attached to the reproducing device, and may be, e.g., a hard disc. In the case where the data reproducing device reproduces data recorded on the hard disc, data D1 in FIG. 2 may store, e.g., the folder name indicating the storage location of the file instead of the disc name. The record medium is not restricted to the disc, and may be a memory card or the like, in which case the data reproducing device of the invention can likewise be applied.

In some cases, the file cannot be reproduced due to a scratch occurring on the record surface of the disc, or the file can be rendered reproducible by removing a smear. For updating the select information corresponding to these cases when necessary, it is merely necessary to add the processing between the steps S31 and S32 in FIG. 4 for updating the flag of the select information corresponding to the reproduction result of the file.

According to the embodiment, as described above, the device produces the list of the reproducible files based on the reproduction result of the files prestored in the flash memory, and reproduces the data after determining according to this list whether the file in question is reproducible or not. This prevents the problem of continuing reproduction of the non-reproducible data, and therefore the waiting time before the start of the reproduction can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data reproducing device comprising:

a reading unit reading a plurality of data files recorded on a removable record medium;

a storing unit nonvolatilely storing select information provided for each said record medium and indicating for each of said plurality of data files whether the data file is to be selected as a reproduction target or not; and a reproducing unit reproducing the data file selected based on said select information, and changing said select information not to select said selected data file in subsequent reproducing operations when said selected data file is not reproducible, wherein said reproducing unit includes a display unit displaying data information relating to said plurality of data files, an input unit receiving a select signal provided from a user when said user selects the data file to be reproduced based on said data information, a control circuit operating, when said select signal is not input from said input unit, to change said select information not to select said selected data file in subsequent selection when non-reproducibility is indicated by a reproduction result received in response to output of a reproduction instruction for said selected data file, and operating, when said select signal is input from said input unit, to change said select information not to select in subsequent reproduction a data file selected by said user for which non-reproducibility is indicated by the reproduction result received in response to output of the reproduction instruction for the data file selected by said user according to said select signal regardless of whether said selected information corresponding to the data file selected by said user indicates that the data file is selected as said reproduction target, and operating to change said select information to select the data file selected by said user in subsequent reproduction as said reproduction target if a result of reproducing the data file selected by said user indicates that the data file selected by said user is reproducible while said select information indicates that the data file selected by said user does not correspond to said reproduction target, a reproducing circuit reproducing the data file according to said reproduction instruction without outputting a picture or sound to outside, and providing said reproduction result, in the case where said select information relating to said record medium is not stored in said storing unit, said control circuit evaluates, based on an extension of each of the data files, the possibility of the reproduction for each of said plurality of data files, and stores the evaluation result as said select information on said storing unit.

2. A data reproducing device comprising:

a reading unit reading a plurality of data files recorded on a record medium;

a storing unit storing select information indicating for each of said plurality of data files whether the data file is to be selected as a reproduction target or not; and a reproducing unit reproducing the data file selected based on said select information, and changing said select information not to select said selected data file in subsequent reproducing operations when said selected data file is not reproducible, wherein said reproducing unit includes a display unit displaying data information relating to said plurality of data files, an input unit receiving a select signal provided from a user when said user selects the data file to be reproduced based on said data information, a control circuit operating, when said select signal is not input from said input unit, to change said select information not to select said selected data file in subsequent selection when non-reproducibility is indicated by a reproduction result received in response to output of a reproduction instruction for said selected data file, and operating, when said select signal is input from said input unit, to change said select information not to select in subsequent reproduction a data file selected by said user for which non-reproducibility is indicated by the reproduction result received in response to output of the reproduction instruction for the data file selected by said user according to said select signal regardless of whether said select information corresponding to the data file selected by user indicates that the data file is selected as said reproduction target, and operating to change said select information to select the data file selected by said user in subsequent reproduction as said reproduction target if a result of reproducing the data file selected by said user indicates that the said file selected by said user is reproducible while said select information indicates that the data file selected by said user does not correspond to said reproduction target, a reproducing circuit reproducing the data file according to said reproduction instruction without outputting a picture or sound to outside, and providing said reproduction result, in the case where said select information relating to said record medium is not stored in said storing unit, said control circuit evaluates based on an extension of each of the data files, the possibility of the reproduction for each of said plurality of data files, and stores the evaluation result as said select information on said storing unit.

3. The data reproducing device according to claim 2, wherein said record medium is removable.

4. The data reproducing device according to claim 2, wherein said control circuit sets said select information for each said record medium.

* * * * *